US007774118B2

(12) United States Patent
Hata et al.

(10) Patent No.: US 7,774,118 B2
(45) Date of Patent: Aug. 10, 2010

(54) CONTROL APPARATUS AND CONTROL METHOD OF A VEHICLE, AND RECORDING MEDIUM ON WHICH A PROGRAM THAT COMMANDS A COMPUTER TO REALIZE THAT CONTROL METHOD IS RECORDED

(75) Inventors: Yasuyuki Hata, Toyota (JP); Kouji Oshima, Nagoya (JP); Eiji Fukushiro, Nagoya (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 271 days.

(21) Appl. No.: 11/923,702

(22) Filed: Oct. 25, 2007

(65) Prior Publication Data

US 2008/0103664 A1 May 1, 2008

(30) Foreign Application Priority Data

Oct. 25, 2006 (JP) ............................. 2006-290220

(51) Int. Cl.
*G06F 7/00* (2006.01)
*G06F 17/00* (2006.01)
(52) U.S. Cl. ..................................................... 701/55
(58) Field of Classification Search ................... 701/51, 701/55
See application file for complete search history.

(56) References Cited

U.S. PATENT DOCUMENTS

| 6,442,467 B1 | 8/2002 | Schuler et al. |
| 6,459,979 B2 * | 10/2002 | Murakami .................... 701/54 |
| 2006/0234830 A1 * | 10/2006 | Iriyama et al. ............... 477/109 |

FOREIGN PATENT DOCUMENTS

| JP | 5-99314 A | 4/1993 |
| JP | 07-019325 A | 1/1995 |
| JP | 07-119814 A | 5/1995 |
| JP | 2002-525539 A | 8/2002 |
| JP | 2004-19713 A | 1/2004 |
| JP | 2004-183889 A | 7/2004 |
| WO | WO 00/19129 A1 | 4/2000 |

* cited by examiner

*Primary Examiner*—Jack Keith
*Assistant Examiner*—Imran Mustafa
(74) *Attorney, Agent, or Firm*—Sughrue Mion, PLLC

(57) ABSTRACT

An ECT_ECU executes a program that includes the steps of i) starting a TD (1) timer when a shift determination is made and a change amount ΔTH of a throttle opening amount is greater than ΔTH (1), ii) starting a TD (2) timer when ΔTH is greater than ΔTH (2), iii) outputting a shift command after time measured by the TD (2) timer reaches a predetermined period of time unless a shift determination is made, and iv) executing shift control based on the shift command that was output.

5 Claims, 8 Drawing Sheets

CONTROL APPARATUS AND CONTROL METHOD OF A VEHICLE, AND RECORDING MEDIUM ON WHICH A PROGRAM THAT COMMANDS A COMPUTER TO REALIZE THAT CONTROL METHOD IS RECORDED

INCORPORATION BY REFERENCE

The disclosure of Japanese Patent Application No. 2006-290220 filed on Oct. 25, 2006, including the specification, drawings and abstract is incorporated herein by reference in its entirety.

BACKGROUND OF THE INVENTION

1. Field of the Invention

The invention relates to a control apparatus of an automatic transmission mounted in a vehicle. More specifically, the invention relates to a control apparatus which promptly establishes and outputs a shift command when a downshift is to be performed through a plurality of speeds.

2. Description of the Related Art

Typically, an automatic transmission mounted in a vehicle shifts speeds based on a demand for acceleration by a driver, the running state of the vehicle, and the operating state of the automatic transmission, and the like. For example, when the driver deeply depresses the accelerator, the speed is calculated based on that depression amount, the throttle opening amount, and the vehicle speed and the like, and a downshift (i.e., a shift toward the deceleration side) is performed. Technology is known that executes shift control according to a predetermined shift pattern as shift control of an automatic transmission.

For example, Japanese Patent Application Publication No. 5-99314 (JP-A-5-99314) describes a control apparatus of an automatic transmission that performs optimum shift logic (i.e., shift output) when shifts according to various shift patterns are to be performed. This control apparatus has a main shift unit and an auxiliary shift unit to which the main shift unit is connected. The control apparatus uses the main shift unit and the auxiliary shift unit to establish multiple speeds. The control apparatus also includes means for detecting a running condition of the vehicle; shift determining means for receiving a signal indicative of the running condition, making a shift determination, and generating a shift determination signal; a shift pattern table that typifies the kinds of shifts into a plurality of shift patterns and provides shift logic for each shift pattern; pattern selecting means for receiving the shift determination signal generated by the shift determining means and selecting the optimum shift logic referencing the shift pattern table; shift setting means for setting a shift corresponding to the shift logic that was selected by the pattern selecting means; and a hydraulic control circuit that receives a shift signal generated by the shift selecting means and selectively supplies and drains hydraulic fluid to and from a hydraulic servo of each of a plurality of frictional engagement elements.

According to the control apparatus described in the foregoing publication, the optimum shift logic for each type of shift can be performed. As a result, the shift duration can be prevented from increasing and shift shock can be prevented from occurring.

However, in the control apparatus described in the foregoing publication, the next shift is predicted by a change in the throttle opening amount. Also, when starting a shift through a plurality of speeds, a shift command for an appropriate speed is output after a predetermined period of time has passed according to a timer such that the shift command is not output in an intermediate speed.

At this time, the timer operates from the time a speed other than the currently selected speed was established as a target speed based on the throttle opening amount until a predetermined period of time has passed.

The predetermined period of time is set uniformly taking into account the various shift modes such as a downshift through a plurality of speeds such as third speed or second speed. Therefore, in order to prevent shift logic for an intermediate speed from being performed, the predetermined period of time must be set longer. As a result, it takes more time for a shift command to be output.

SUMMARY OF THE INVENTION

This invention thus provides a control apparatus for a vehicle which promptly outputs an established shift command when a downshift through a plurality of speeds is to be performed, a control method, and a recording medium on which a program that commands a computer to realize that control method is recorded.

A first aspect of the invention relates to a control apparatus of a vehicle provided with a stepped automatic transmission having a plurality of speeds. This control apparatus includes i) a detecting portion that detects a amount of increase in vehicle driving force required by a driver (hereinafter this amount will also be referred to as the "amount of increase required"); ii) a determining portion that determines a target speed based on the amount of increase required; iii) an establishing portion that establishes the determined target speed based on a change rate of the amount of increase required; and iv) a control portion that controls the automatic transmission to shift into the established target speed. The establishing portion establishes the target speed based on the change rate of the amount of increase required each time the determined target speed is changed. A control method of a vehicle according to a second aspect has a structure similar to that of the control apparatus according to the first aspect.

According to this aspect, the establishing portion establishes a target speed based on the change rate of the amount of increase in the vehicle driving force required each time a determined target speed is changed. When the change rate of the amount of increase in the vehicle driving force required is large at the time the target speed is determined, it is predicted that the shift will be a downshift, i.e., a shift into a speed farther toward the deceleration side. Therefore, for example when, each time the target speed is changed, the period of time corresponding to the target speed that was changed is set as a waiting period and a downshift is performed through a plurality of speeds in response to a demand to increase the driving force, the waiting period can be set shorter than it is when a uniform period of time is set from the earliest point at which the downshift was determined. This is because the shift mode after the target speed that was changed has been made the reference is limited. As a result, the shift command that was established can be promptly output. Also, when the change rate of the amount of increase required is small, the automatic transmission will not downshift farther so if the target speed is established quickly, the established shift command can be promptly output even during the waiting period. Therefore, a control apparatus and control method of a vehicle, which promptly outputs an established shift command when a downshift is to be performed through a plurality of speeds can be provided.

The control apparatus according to the foregoing aspect may further include a timing portion that starts to measure a predetermined period of time corresponding to each target speed when the target speed is determined by the determining portion and the change rate of the amount of increase required is greater than a predetermined value.

In the control apparatus, when the change rate of the amount of increase required is less than a predetermined value and the target speed does not change, the establishing portion may establish the target speed after the predetermined period of time which corresponds to the target speed that does not change and which was measured by the timing portion has passed.

In the control apparatus according to the foregoing aspect, when the change rate of the amount of increase required is less than a predetermined value and the target speed does not change, the establishing portion may establish the target speed after a predetermined period of time corresponding to the determined target speed has passed from the most recent point at which the target speed was determined.

According to this structure, the waiting period of the shift command output (i.e., during which the shift command is not output) when a downshift is performed through a plurality of speeds is set as the period of time from the most recent point after the target speed was determined until a period of time corresponding to the target speed has passed. Therefore, the waiting period can be set shorter than it is when a uniform period of time is set from the earliest point at which the downshift was determined.

The establishing portion in the control apparatus according to the first aspect may also establish the determined target speed when the change rate of the amount of increase required is equal to or less than a predetermined value.

According to this structure, when the change rate of the amount of increase required is equal to or less than a predetermined value, the target speed can be established quickly so a shift command can be output early.

The control apparatus according to the foregoing structure may also include a vehicle speed detecting portion that detects a physical quantity corresponding to a speed of the vehicle. The determining portion may also determine the target speed based on the detected physical quantity in addition to the amount of increase required.

According to this structure, determining the target speed based on the speed of the vehicle in addition to the amount of increase in driving force generated by the engine (i.e., the amount of increase required) enables a target speed that corresponds to the running state of the vehicle to be more accurately determined.

A third aspect of the invention relates to a recording medium on which is recorded a program that commands a computer to realize the control method of a vehicle according to the foregoing second aspect.

According to this third aspect, the control method of a vehicle according to the second aspect of the invention can be realized using a computer (either a general computer or a special computer).

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
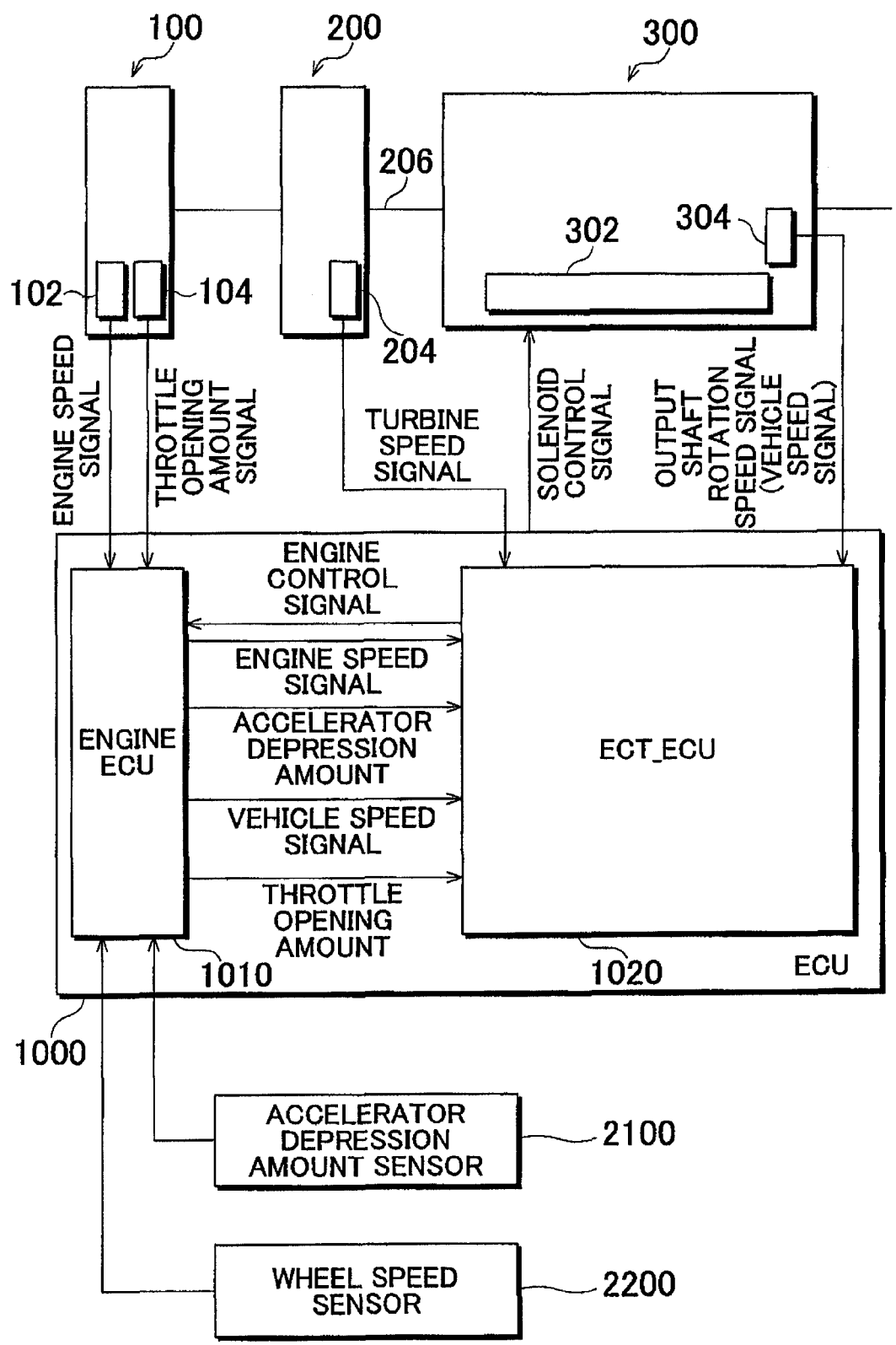
FIG. 1 is a block diagram showing the structure of a powertrain of a vehicle provided with a control apparatus of a vehicle according to one example embodiment of the invention.

Hereinafter, example embodiments of the invention will be described in detail with reference to the accompanying drawings. In the following description, like parts will be denoted by like reference numerals. Like parts will also be referred to by the same nomenclature and will have the same function. Therefore, detailed descriptions of those parts will not be repeated.

A powertrain of a vehicle that includes a control apparatus according to an example embodiment of the invention will now be described. In this example embodiment, the automatic transmission described is one which has a torque converter as a fluid coupling and shifting mechanism. Incidentally, the invention may also be applied to a stepped automatic transmission having a plurality of speeds.

The powertrain of the vehicle that includes the control apparatus according to this example embodiment will now be described with reference to FIG. 1. The control apparatus according to this example embodiment is specifically realized by an ECT (Electronically Controlled Automatic Transmission)_ECU (Electronic Control Unit) 1020 shown in FIG. 1.

As shown in FIG. 1, the powertrain of this vehicle includes an engine 100, a torque converter 200, an automatic transmission 300, and an ECU 1000.

An output shaft of the engine 100 is connected to an input shaft of the torque converter 200. The engine 100 and the torque converter 200 are connected together by a rotating shaft. Therefore, the output shaft rotation speed NE of the engine 100 (i.e., the engine speed NE) detected by an engine speed sensor 102 and the input shaft rotation speed of the torque converter 200 (i.e., the pump speed) are the same.

The torque converter 200 includes a lockup clutch that places the input shaft and the output shaft in a directly-coupled (i.e., direct drive) state; a pump impeller, not shown, on the input shaft side; a turbine runner on the output shaft side; and a stator which has a one-way clutch and functions to multiply torque (neither the turbine runner nor the stator is shown). The torque converter 200 and the automatic transmission 300 are connected by a rotating shaft 206. The output shaft rotation speed NT of the torque converter 200 (i.e., the turbine speed NT) is detected by a turbine speed sensor 204. The output shaft rotation speed NOUT of the automatic transmission 300 is detected by an output shaft rotation speed sensor 304.

A plurality of clutches and brakes, i.e., friction elements, are provided inside this kind of automatic transmission 300. A hydraulic circuit 302 is controlled such that clutch elements (e.g., clutches C1 to C4), brake elements (e.g., brakes B1 to B4), and one-way clutch elements (e.g., one-way clutches F0 to F3), all of which are friction elements, are engaged and disengaged according to the required speed of the automatic transmission 300. Shift positions of the automatic transmission 300 include a parking (P) position, a reverse running or reverse (R) position, a neutral (N) position, and a forward running or drive (D) position.

The ECU 1000 that controls this powertrain includes an engine ECU 1010 that controls the engine 100, and the ECT_ECU 1020 that controls the automatic transmission 300.

The ECT_ECU 1020 receives a signal indicative of the output shaft rotation speed NOUT detected by the output shaft rotation speed sensor 304. Also, the ECT_ECU 1020 receives an engine speed signal indicative of the engine speed NE detected by the engine speed sensor 102. The ECT_ECU 1020 also receives a signal indicative of the turbine speed NT detected by the turbine speed sensor 204 of the torque converter 200, as well as a throttle opening amount signal indicative of the throttle opening amount detected by a throttle opening amount sensor 104 from the engine ECU 1010.

The engine speed sensor 102 is provided facing teeth of a rotational detection gear that is mounted on the output shaft of the engine 100 (i.e., on the input shaft of the torque converter 200). The output shaft rotation speed sensor 304 is provided facing teeth of a rotational detection gear mounted on the output shaft of the automatic transmission 300. The turbine speed sensor 204 is provided facing teeth of a rotational detection gear mounted on the output shaft of the torque converter 200

These rotation speed sensors are sensors that can also detect the slightest rotation of the input shaft of the torque converter 200, the output shaft of the torque converter 200, and the output shaft of the automatic transmission 300. These sensors are, for example, sensors that use a magnetoresistive element which are generally referred to as semiconductor type sensors.

Moreover, the ECT_ECU 1020 outputs an engine control signal (such as a throttle opening amount signal) to the engine ECU 1010, and the engine ECU 1010 controls the engine based on that engine control signal and other control signals. The ECT_ECU 1020 controls the engaging force (i.e., engaging pressure) of the lockup clutch provided in the torque converter 200 based on the detection results from the various sensors. The ECT_ECU 1020 also outputs a solenoid control signal to the automatic transmission 300. Linear solenoid valves and ON-OFF solenoid valves and the like which constitute the hydraulic circuit 302 of the automatic transmission 300 are controlled based on this solenoid control signal, and the friction engagement elements are controlled to engage and disengage so as to establish a predetermined speed (e.g., first speed to fifth speed).

Further, the ECT_ECU 1020 receives a signal indicative of a depression amount of an accelerator pedal operated by a driver from an accelerator depression amount sensor 2100 via the engine ECU 1010. The ECT_ECU 1020 also receives a signal indicative of the rotation speed of the wheels (hereinafter also referred to as the "speed of the wheels" or the "wheel speed") from a wheel speed sensor 2200 via the engine ECU 1010. Also, the ECT_ECU 1020 includes memory in which are stored various data (e.g., threshold values, shift maps, etc.) and programs.

In a vehicle having a structure such as that described above, the ECT_ECU 1020 determines a target speed (e.g., a speed from first speed to fifth speed) based on the amount of increase in vehicle driving force required by the driver. Also, the ECT_ECU 1020 establishes the determined target speed based on the rate of change in that amount of increase required. Furthermore, the ECT_ECU 1020 controls the hydraulic circuit 302 of the automatic transmission 300 to shift into the established target speed. The invention has a characteristic in which the target speed is established based on the rate of change in the amount of increase required each time the determined target speed is changed. Incidentally, in this example embodiment, the amount of increase in the vehicle driving force required is detected by the throttle opening amount. However, the invention is not limited to this. For example, it may also be detected using the accelerator depression amount instead of the throttle opening amount.

Hereinafter, the structure of the ECT_ECU 1020 which serves as the control apparatus of a vehicle according to this example embodiment will be described using the functional block diagram shown in FIG. 2.

Figure 2:
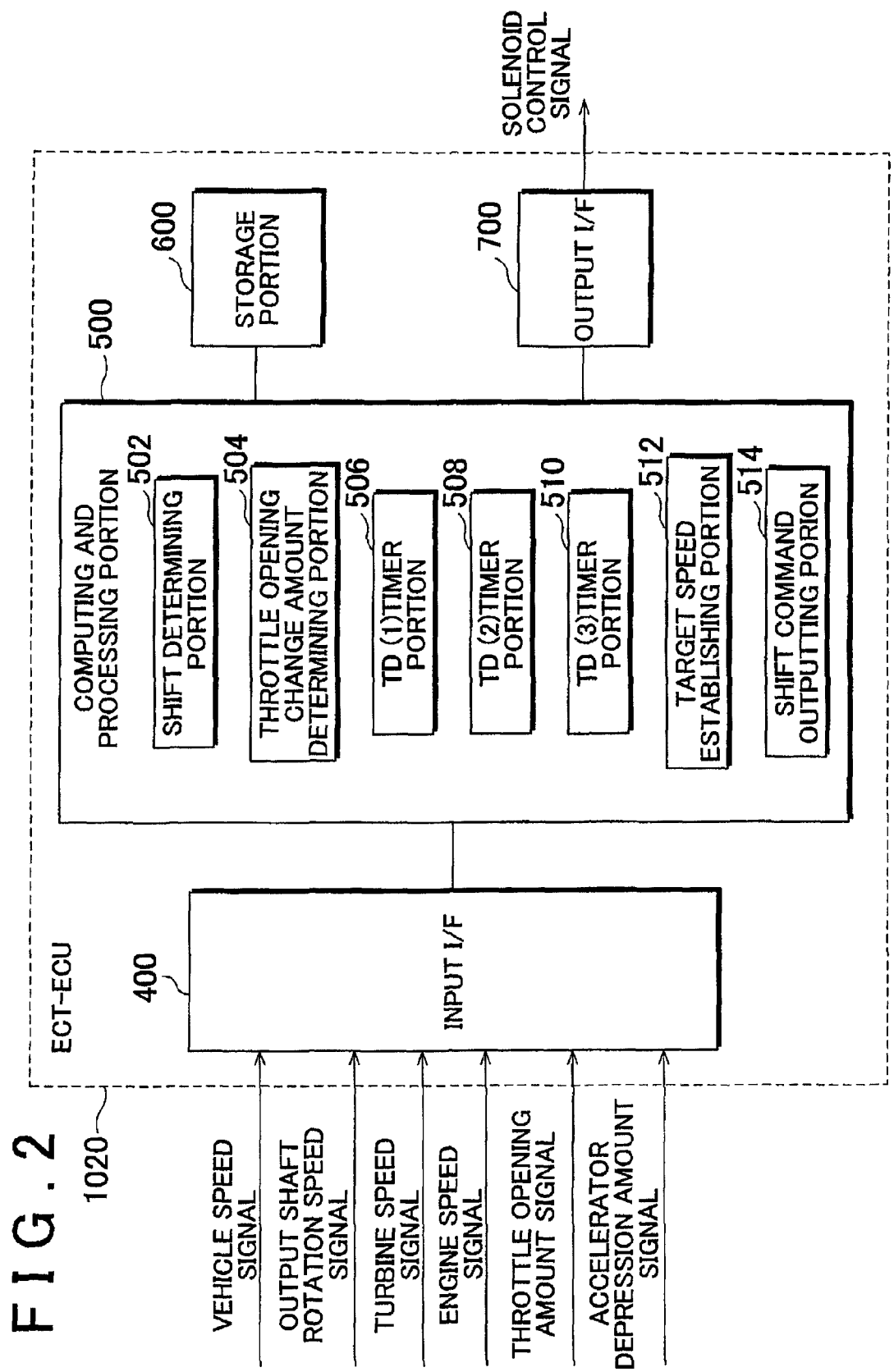
FIG. 2 is a functional block diagram showing the structure of an ECT_ECU which serves as the control apparatus according to this example embodiment.

As shown in FIG. 2, the ECT_ECU 1020 includes an input interface (hereinafter referred to as "input I/F") 400 that receives signals from the engine ECU 1010 and the various sensors; a computing and processing portion 500 formed mainly of a CPU (Central Processing Unit); a storage portion 600 realized by memory and the like; and an output interface (hereinafter referred to as "output I/F") 700 that outputs to the hydraulic circuit 302 a solenoid control signal based on the calculated results from the computing and processing portion 500.

In this example embodiment, the input I/F 400 receives a vehicle speed signal, an output shaft rotation speed signal, a turbine speed signal, an engine speed signal, a throttle opening amount signal, and an accelerator depression amount signal from the engine ECU 1010 and the various sensors.

The computing and processing portion 500 includes a shift determining portion 502, a portion 504 that determines the amount of change in the throttle opening amount (hereinafter this portion will simply be referred to as the "throttle opening change amount determining portion"), a TD (1) timer portion 506, a TD (2) timer portion 508, a TD (3) timer portion 510, a target speed establishing portion 512, and a shift command outputting portion 514.

The shift determining portion 502 determines a target speed based on the throttle opening amount. More specifically, the shift determining portion 502 determines the target speed based on the throttle opening amount, the vehicle speed, and a shift map.

The shift map indicates the timings of upshifts and downshifts into the most appropriate speed based on the throttle opening amount and the vehicle speed. The shift map includes a plurality of downshift lines and a plurality of upshift lines. When the position on the shift map specified based on the detected throttle opening amount and the vehicle speed crosses a downshift line to the downshift side (for example, when the throttle opening amount increases while the vehicle is running at a constant speed), the shift determining portion 502 sets the speed corresponding to the downshift line that was crossed as the target speed.

Incidentally, the shift map is not particularly limited to the throttle opening amount and the vehicle speed as long as the map indicates the timings of downshifts and upshifts in a relationship between the amount of increase required with respect to the engine 100 and a physical quantity corresponding to the vehicle speed. For example, the shift map may also be a map that indicates the timing of downshifts and upshifts in any of i) a relationship between the accelerator depression amount and the output shaft rotation speed, ii) the relationship between the throttle opening amount and the output shaft rotation speed, and iii) the relationship between the accelerator depression amount and the vehicle speed.

In this example embodiment, the shift determining portion 502 makes a shift determination four times at most until the target speed is established during one cycle of shift control. That is, the shift determining portion 502 makes a shift determination each time a downshift line is crossed until the target speed is established. A shift determination is not made after the target speed has been established. In the following description, the first to the fourth shift determinations will be referred to as shift determinations (1) to (4). Incidentally, the shift determination is not particularly limited to being made four times.

The shift determining portion 502 may also turn a shift determination flag (1) to (4) on each time there is a determination (1) to (4) to shift (hereinafter simply referred to as a "shift determination (1) to (4)"), for example.

The throttle opening change amount determining portion 504 determines whether an amount of change ΔTH per unit time in the throttle opening amount detected by the throttle opening amount sensor 104 (hereinafter this amount of change will simply be referred to as the "change amount") is greater than a predetermined change amount corresponding to the speed after the determination.

More specifically, in each of the four shift determinations (1) to (4) it is determined whether the change amount ΔTH of the throttle opening amount is greater than the respective predetermined change amount ΔTH corresponding to the speed after the determination.

Incidentally, the predetermined change amounts ΔTH (1) to (4) corresponding to the speeds after the determination in the shift determinations (1) to (4) may be different values or the same values. The invention is not particularly limited with respect to this.

The throttle opening change amount determining portion 504 may also turn on a corresponding flag from among change amount determination flags (1) to (4) when the change amount ΔTH of the detected throttle opening amount is greater than any of the change amounts ΔTH (1) to (4). For example, after the shift determination (1) has been made, the throttle opening change amount determining portion 504 turns on the shift amount determination flag (1) if ΔTH is greater than ΔTH (1), and after the shift determination (4) has been made, the throttle opening change amount determining portion 504 turns on the change amount determination flag (4) if ΔTH is greater than ΔTH (4).

When the shift determining portion 502 makes the shift determination (1) and the change amount ΔTH of the throttle opening amount is greater than the predetermined change amount ΔTH (1) corresponding to the determined speed, the TD (1) timer portion 506 starts to measure the time until a predetermined period of time (1) has passed. This predetermined period of time (1) is set for each speed. That is, the TD (1) timer portion 506 starts to measure the time until the predetermined period of time corresponding to the speed determined in the shift determination (1) has passed.

Incidentally, the TD (1) timer portion 506 may also start measuring time when both the shift determination flag (1) and the change amount determination flag (1) are on.

When the shift determining portion 502 makes the shift determination (2) and the change amount ΔTH of the throttle opening amount is greater than the predetermined change amount ΔTH (2) corresponding to the determined speed, the TD (2) timer portion 508 starts to measure the time until a predetermined period of time (2) has passed. This predetermined period of time (2) is set for each speed. That is, the TD (2) timer portion 506 starts to measure the time until the predetermined period of time corresponding to a speed determined in the shift determination (2) has passed.

Incidentally, the TD (2) timer portion 508 may also start measuring time when both the shift determination flag (2) and the change amount determination flag (2) are on.

When the shift determining portion 502 makes the shift determination (3) and the change amount ΔTH of the throttle opening amount is greater than the predetermined change amount ΔTH (3) corresponding to the determined speed, the TD (3) timer portion 510 starts to measure the time until a predetermined period of time (3) has passed. This predetermined period of time (3) is set for each speed. That is, the TD (3) timer portion 510 starts to measure the time until the predetermined period of time corresponding to the speed determined in the shift determination (3) has passed.

Incidentally, the TD (3) timer portion 510 may also start measuring time when both the shift determination flag (3) and the change amount determination flag (3) are on.

Also, the predetermined periods of time (1) to (3) are each set to become shorter as the speed is shifted toward the low speed side. Also, the predetermined periods of time (1) to (3) corresponding to the same speed may also be set so that they are all the same.

The target speed establishing portion 512 establishes a target speed based on the calculation results of the shift determining portion 502, the throttle opening change amount determining portion 504, and the TD (1) timer portion 506, the TD (2) timer portion 508, and the TD (3) timer portion 510.

More specifically, the target shift establishing portion 512 establishes the speed determined in the shift determination (1) as the target speed when the change amount ΔTH of the throttle opening amount is equal to or less than ΔTH (1) in the shift determination (1). Incidentally, the target speed establishing portion 512 may also establish the speed determined in the shift determination (1) as the target speed when the shift determination flag (1) is on, the shift determination flags (2) to (4) are off, and the change amount determination flag (1) is off.

The target speed establishing portion 512 establishes the speed determined in the shift determination (2) as the target speed irrespective of the time that was measured by the TD (1) timer portion 506 when the change amount ΔTH of the throttle opening amount is equal to or less than ΔTH (2) in the shift determination (2). Incidentally, the target speed establishing portion 512 may also establish the speed determined in the shift determination (2) as the target speed when the shift determination flag (2) is on, the shift determination flags (3) and (4) are off, and the change amount determination flag (2) is off.

The target speed establishing portion 512 establishes the speed determined in the shift determination (3) as the target speed irrespective of the time that was measured by the TD (1) timer portion 506 and the TD (2) timer portion 508 when the change amount ΔTH of the throttle opening amount is equal to or less than ΔTH (3) in the shift determination (3). Incidentally, the target speed establishing portion 512 may also establish the speed determined in the shift determination (3) as the target speed when the shift determination flag (3) is on, the shift determination flag (4) is off, and the change amount determination flag (3) is off.

The target speed establishing portion 512 establishes the speed determined in the shift determination (4) as the target speed irrespective of the time that was measured by the TD (1) timer portion 506, the TD (2) timer portion 508, and the TD (3) timer portion 510 when the change amount ΔTH of the throttle opening amount is equal to or less than ΔTH (4) in the shift determination (4). Incidentally, the target speed establishing portion 512 may also establish the speed determined in the shift determination (4) as the target speed when the shift determination flags (1) to (3) are on, the shift determination flag (4) is off, and the change amount determination flag (4) is off.

Also, the target speed establishing portion 512 establishes the speed determined in the shift determination (1) as the target speed when the time measured by the TD (1) timer portion 506 passes the predetermined period of time (1) without making the shift determination (2).

The target speed establishing portion 512 establishes the speed determined in the shift determination (1) as the target speed when only the shift determination flag (1) is on and the time measured by the TD (1) timer portion 506 passes the predetermined period of time (1), for example.

Also, the target speed establishing portion 512 establishes the speed determined in the shift determination (4) as the target speed when the time measured by the TD (1) timer portion 506 has passed the predetermined period of time (1) when the shift determination (4) is made and the change amount ΔTH of the throttle opening amount is greater than ΔTH (4).

The target speed establishing portion 512 establishes the speed determined in the shift determination (4) as the target speed when the time measured by the TD (1) timer portion 506 has passed the predetermined period of time (1) when, for example, the shift determination flags (1) to (4) are on and the change amount determination flag (4) is on.

Furthermore, the target speed establishing portion 512 establishes the speed determined in the shift determination (2) as the target speed when the shift determination (2) is made and the time measured by the TD (2) timer portion 508 has passed the predetermined period of time (2) without the shift determination (3) being made.

The target speed establishing portion 512 establishes the speed determined in the shift determination (2) as the target speed when, for example, only the shift determinations (1) and (2) are made and the time measured by the TD (2) timer portion 508 has passed the predetermined period of time (2).

Moreover, the target speed establishing portion 512 establishes the speed determined in the shift determination (3) as the target speed when the shift determination (3) is made and the time measured by the TD (3) timer portion 510 has passed the predetermined period of time (3) without the shift determination (4) being made.

The target speed establishing portion 512 establishes the speed determined in the shift determination (3) as the target speed when, for example, only the shift determinations (1) to (3) are made and the time measured by the TD (3) timer portion 510 has passed the predetermined period of time (3).

The shift command outputting portion 514 sends a solenoid control signal corresponding to the shift command indicating the established target speed to the hydraulic circuit 302 via the output I/F 700.

Various programs and various information including the threshold values of ΔTH (1) to (4) and the predetermined periods of time (1) to (3) and the like, which are set corresponding to each speed, are stored in advance in the storage portion 600.

In this example embodiment, the shift determining portion 502, the throttle opening change amount determining portion 504, the TD (1) timer portion 506, the TD (2) timer portion 508, the TD (3) timer portion 510, the target speed establishing portion 512, and the shift command outputting portion 514 are all described as functioning as software, in which they are realized by the CPU, which is the computing and processing portion 500, executing a program stored in the storage portion 600. Alternatively, however, they may also be realized by hardware. Incidentally, this kind of program is recorded on a recording medium and this recording medium is provided in a vehicle.

Figure 3A:
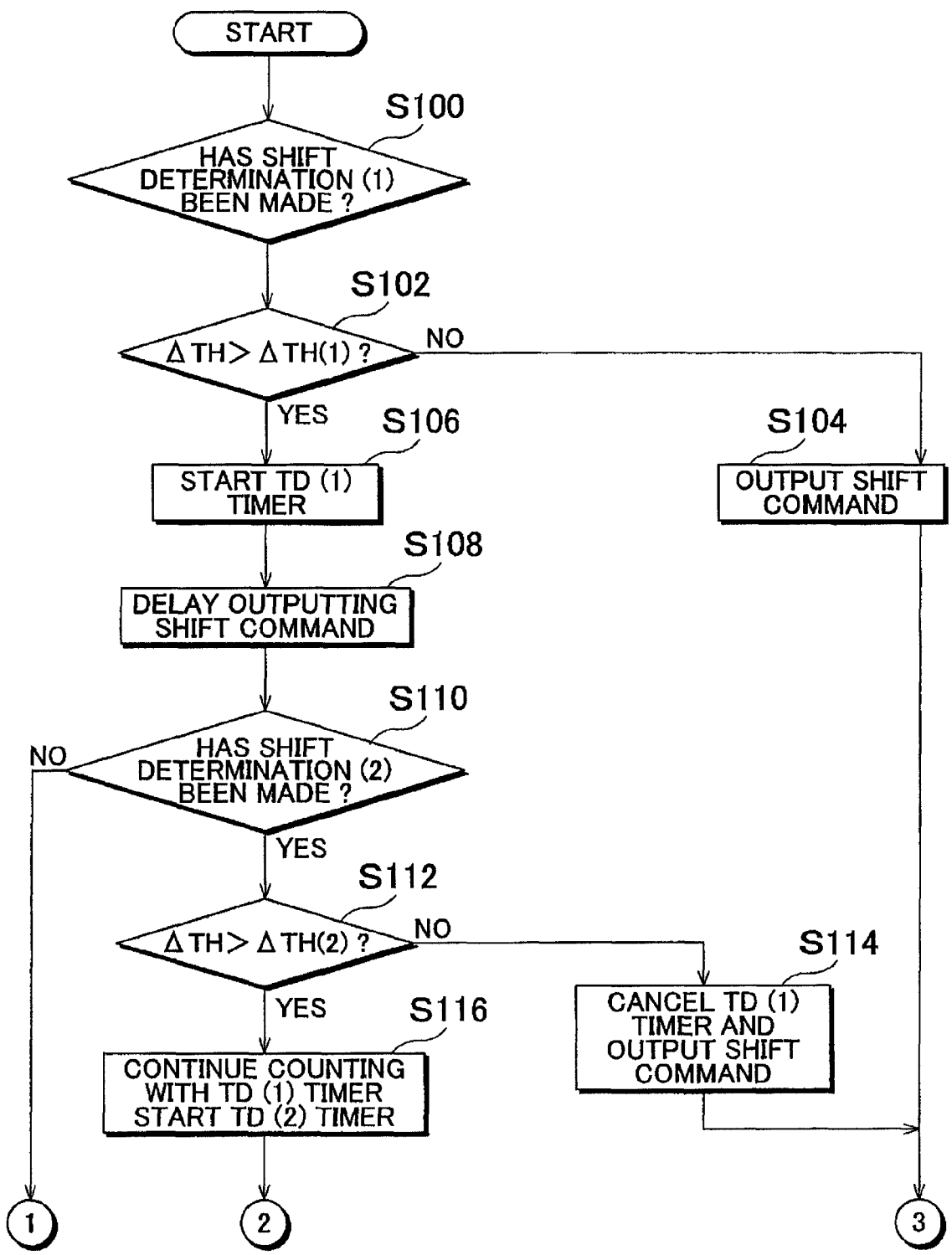
FIG. 3 is a flowchart illustrating the control structure of a program executed by the ECT_ECU that serves as the control apparatus according to this example embodiment.
Figure 3B:
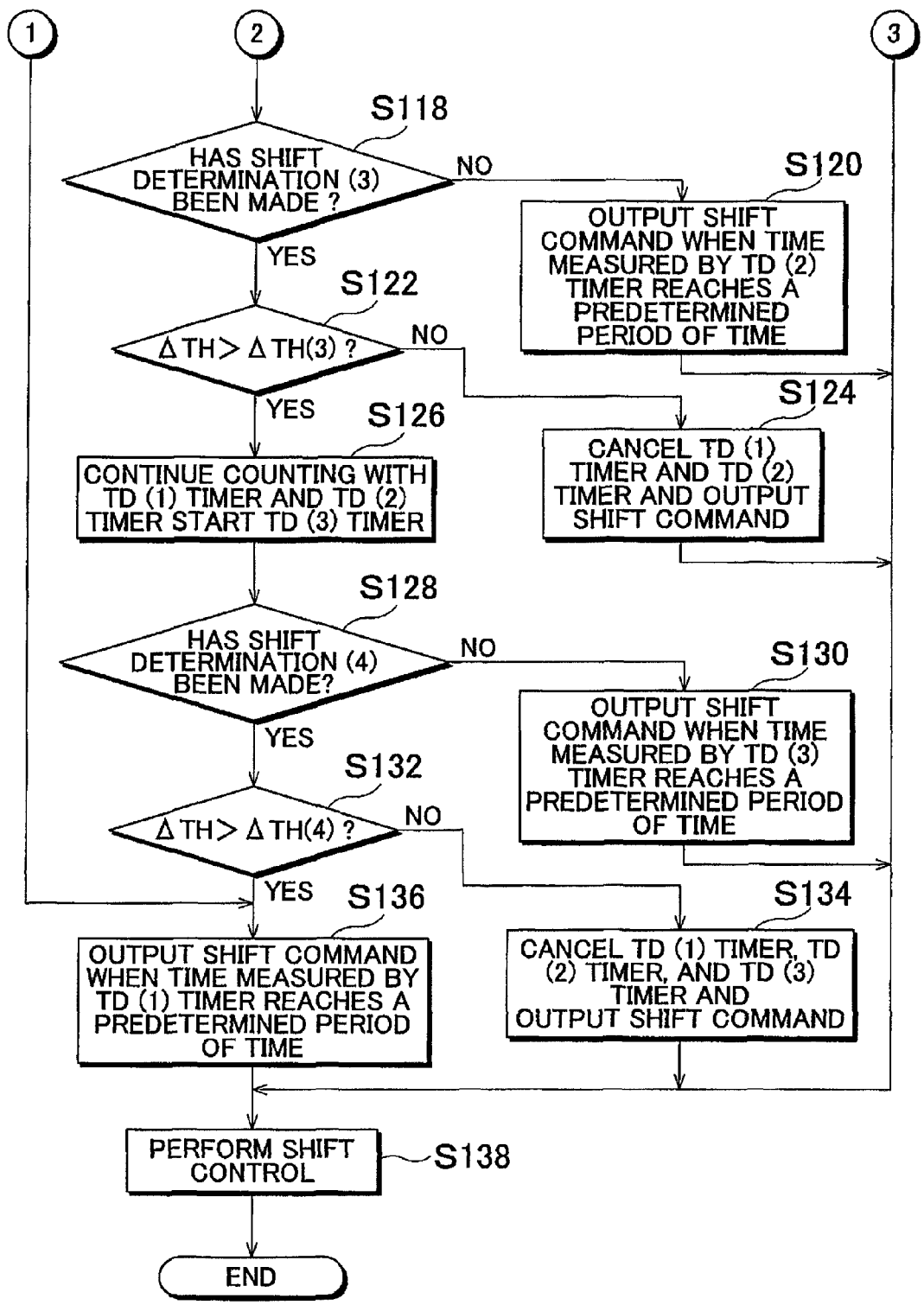

The control structure of a program executed by the ECT_ECU 1020 that serves as the control apparatus of a vehicle according to this example embodiment that has a structure such as that described above will be described with reference to FIG. 3.

In step S100, the ECT_ECU 1020 determines whether the shift determination (1) has been made. If the shift determination (1) has been made (i.e., YES in step S100), the process proceeds on to step S102. If not (i.e., NO in step S100), the process returns to step S100 and waits until the shift determination (1) is made.

In step S102, the ECT_ECU 1020 determines whether the change amount ΔTH of the throttle opening amount is greater than ΔTH (1) corresponding to the speed determined in the shift determination (1). If ΔTH is greater than ΔTH (1) (i.e., YES in step S102), the process proceeds on to step S106. If not (i.e., NO in step S102), the process proceeds on to step S104.

In step S104, the ECT_ECU 1020 establishes the speed determined in the shift determination (1) as the target speed and outputs a shift command.

In step S106, the ECT_ECU 1020 starts the TD (1) timer. In step S108, the ECT_ECU 1020 delays outputting of the shift command in conjunction with the start of the TD (1) timer.

In step S110, the ECT_ECU 1020 determines whether the shift determination (2) has been made. If the shift determination (2) has been made (i.e., YES in step S110), the process proceeds on to step S112. If not (i.e., NO in step S110), the process proceeds on to step S136.

In step S112, the ECT_ECU 1020 determines whether the change amount ΔTH of the throttle opening amount is greater than ΔTH (2) corresponding to the speed determined in the shift determination (2). If ΔTH is greater than ΔTH (2) (i.e., YES in step S112), the process proceeds on to step S116. If not (i.e., NO in step S112), the process proceeds on to step S114.

In step S114, the ECT_ECU 1020 cancels the output delay of the shift command by the TD (1) timer, establishes the speed determined in the shift determination (2) as the target speed, and outputs a shift command.

In step S116, the ECT_ECU 1020 continues to measure the time (i.e., count) with the TD (1) timer and starts the TD (2) timer. In step S118, the ECT_ECU 1020 determines whether the shift determination (3) has been made. If the shift determination (3) has been made (i.e., YES in step S118), the process proceeds on to step S122. If not (i.e., NO in step S118), the process proceeds onto step S120.

In step S120, when the time measured by the TD (2) timer reaches a predetermined period of time (2), the ECT_ECU 1020 establishes the speed determined in the shift determination (2) as the target speed and outputs a shift command.

In step S122, the ECT_ECU 1020 determines whether the change amount ΔTH of the throttle opening amount is greater than ΔTH (3) corresponding to the speed determined in the shift determination (3). If ΔTH is greater than ΔTH (3) (i.e., YES in step S122), the process proceeds on to step S126. If not (i.e., NO in step S122), the process proceeds on to step S124.

In step S124, the ECT_ECU 1020 cancels the output delay of the shift command by the TD (1) timer and the TD (2)

timer, establishes the speed determined in the shift determination (3) as the target speed, and outputs a shift command.

In step S126, the ECT_ECU 1020 continues to measure the time (i.e., count) with the TD (1) timer and the TD (2) timer and starts the TD (3) timer.

In step S128, the ECT_ECU 1020 determines whether the shift determination (4) has been made. If the shift determination (4) has been made (i.e., YES in step S128), the process proceeds on to step S132. If not (i.e., NO in step S128), the process proceeds on to step S130.

In step S130, when the time measured by the TD (3) timer reaches a predetermined period of time (3), the ECT_ECU 1020 establishes the speed determined in the shift determination (3) as the target speed and outputs a shift command.

In step S132, the ECT_ECU 1020 determines whether the change amount ΔTH of the throttle opening amount is greater than ΔTH (4) corresponding to the speed determined in the shift determination (4). If ΔTH is greater than ΔTH (4) (i.e., YES in step S132), the process proceeds on to step S136. If not (i.e., NO in step S132), the process proceeds on to step S134.

In step S134, the ECT_ECU 1020 cancels the output delay of the shift command by the TD (1) timer, the TD (2) timer, and the TD (3) timer, establishes the speed determined in the shift determination (4) as the target speed, and outputs a shift command.

In step S136, when the time measured by the TD (1) timer reaches a predetermined period of time (1), the ECT_ECU 1020 establishes the most recently determined speed as the target speed and outputs a shift command. For example, when only the shift determination (1) has been made, the ECT_ECU 1020 establishes the speed determined in the shift determination (1) as the target speed and outputs a speed command. Also, when the shift determination (4) has been made, the ECT_ECU 1020 establishes the speed determined in the shift determination (4) as the target speed and outputs a speed command.

In step S138, the ECT_ECU 1020 executes shift control based on the shift command that was output. More specifically, the ECT_ECU 1020 controls the various solenoid valves of the hydraulic circuit 302 so that the automatic transmission 300 shifts to the established target speed.

The operation of the control apparatus of a vehicle according to this example embodiment which is based on the foregoing structure and flowchart will now be described with reference to FIGS. 4 to 7.

Incidentally, in the following description, the throttle opening amount TH (1) shown in FIGS. 4 to 7 indicates a throttle opening amount that crosses the downshift line from sixth speed to fifth speed. Also, the throttle opening amount TH (2) indicates a throttle opening amount that crosses the downshift line from fifth speed to fourth speed. Further, the throttle opening amount TH (3) indicates a throttle opening amount that crosses the downshift line from fourth speed to third speed. Incidentally, the downshift line changes according to the vehicle speed as well, but for the sake of simplifying the description, the change in vehicle speed when the throttle opening amount changes according to the depression of the accelerator pedal is minimal.

<A Case in which a Downshift Through Second Speed is Performed when the Invention is not Applied>

In this example, the automatic transmission 300 is capable of establishing six speeds. In this case, the speed that is determined based on the throttle opening amount, the vehicle speed, and a shift map is sixth speed, and a shift command indicative of sixth speed is output. In the hydraulic circuit 302, sixth speed is already established so a shift is not performed at this time.

Figure 4:
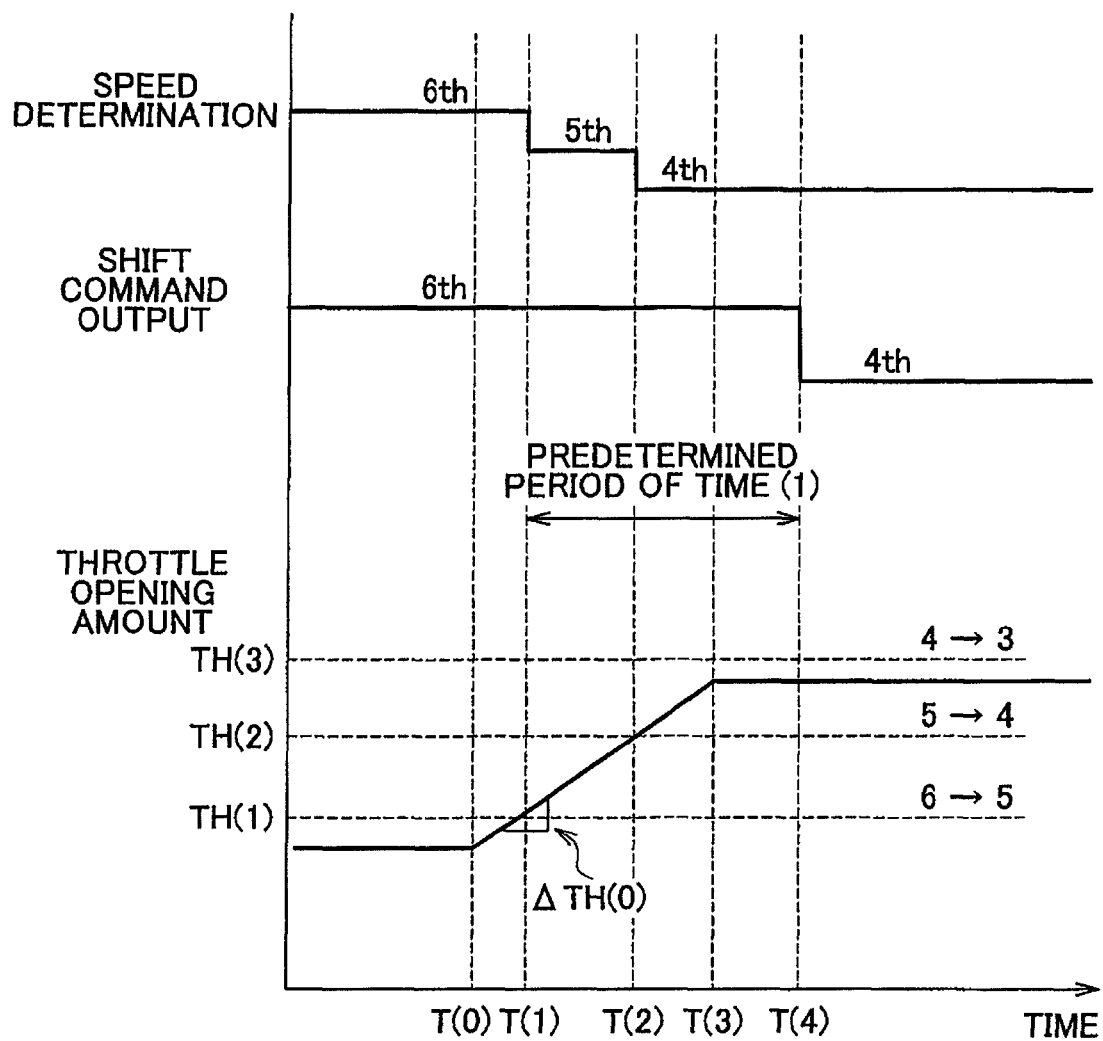
FIG. 4 is a timing chart (part 1) showing a shift operation when the invention is not applied.

As shown in FIG. 4, the throttle opening amount starts to increase at time T (0) when the driver depresses the accelerator pedal, for example.

When the throttle opening amount exceeds TH (1) at time T (1), the ECT_ECU 1020 changes the target speed from sixth speed to fifth speed. Also, as the ECT_ECU 1020 changes the target speed to fifth speed, it also starts the TD (1) timer and delays outputting the shift command if the change amount ΔTH of the throttle opening amount is greater than the ΔTH (0) corresponding to fifth speed. At this time, the TD (1) timer measures a predetermined period of time (1) corresponding to fifth speed.

When the throttle opening amount increases further such that it exceeds TH (2) at time T (2), the ECT_ECU 1020 changes the target speed from fifth speed to fourth speed. During this time, the period of time that was measured by the TD (1) timer has not passed the predetermined period of time (1) so the ECT_ECU 1020 continues to delay outputting of the shift command.

At time T (3), the driver adjusts the depression amount of the accelerator pedal so that throttle opening amount is substantially constant between TH (2) and TH (3).

When the period of time measured by the TD (1) timer passes the predetermined period of time (1) at time T (4), the ECT_ECU 1020 stops delaying outputting the shift command such that a shift command indicative of fourth speed is output.

<A Case in which a Downshift Through Second Speed is Performed when the Invention is Applied>

In this example, the automatic transmission 300 is capable of establishing six speeds. In this case, the speed that is determined based on the throttle opening amount, the vehicle speed, and a shift map is sixth speed, and a shift command indicative of sixth speed is output. In the hydraulic circuit 302, sixth speed is already established so a shift is not performed at this time.

Figure 5:
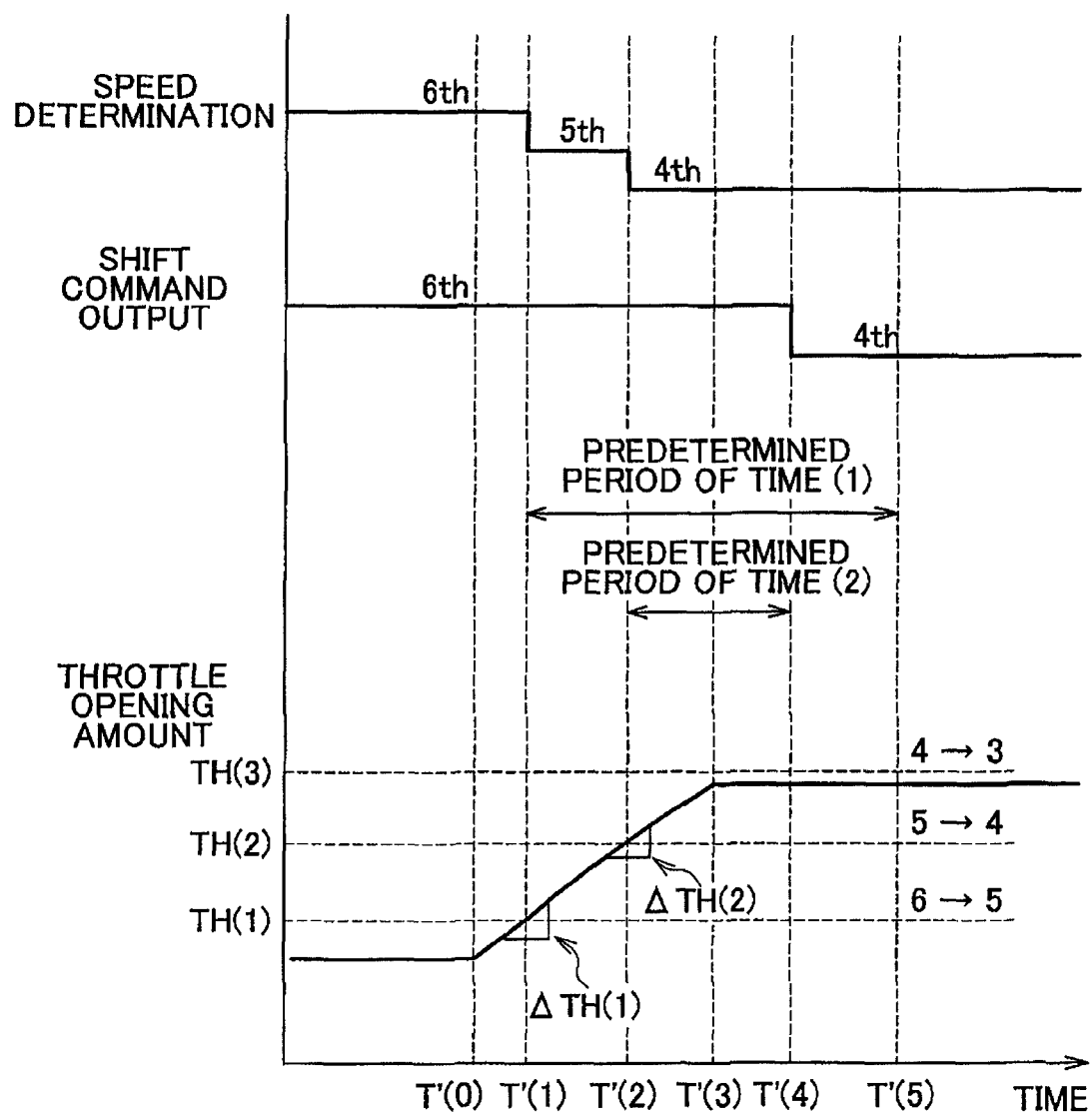
FIG. 5 is a timing chart (part 1) showing the operation of the ECT_ECU that serves as the control apparatus according to this example embodiment.

As shown in FIG. 5, the throttle opening amount starts to increase at time T' (0) when the driver depresses the accelerator pedal, for example.

When the throttle opening amount exceeds TH (1) at time T' (1), the shift determination (1) is made (i.e., YES in step S100) and the ECT_ECU 1020 changes the target speed from sixth speed to fifth speed. As the ECT_ECU 1020 changes the target speed to fifth speed, it also starts the TD (1) timer (step S106) and delays outputting the shift command (step S108) if the change amount ΔTH of the throttle opening amount is greater than the ΔTH (1) corresponding to fifth speed (i.e., YES in step S102). At this time, the TD (1) timer measures a predetermined period of time (1) corresponding to fifth speed.

When the throttle opening amount increases further such that it exceeds TH (2) at time T' (2), the shift determination (2) is made (i.e., YES in step S110) and the ECT_ECU 1020 changes the target speed from fifth speed to fourth speed. Also, if ΔTH is greater than ΔTH (2) corresponding to fourth speed (i.e., YES in step S112), the ECT_ECU 1020 continues to measure the time with the TD (1) timer and also starts the TD (2) timer (step S116). At this time, the TD (2) timer measures a predetermined period of time (2) corresponding to fourth speed.

At time T' (3), the driver adjusts the depression amount of the accelerator pedal so that throttle opening amount is substantially constant between TH (2) and TH (3).

If at time T' (4) the TD (2) timer finishes measuring the predetermined period of time (2) without the shift determination (3) being made (i.e., NO in step S118), the ECT_ECU 1020 establishes the fourth speed determined in the shift determination (2) as the target speed and outputs a shift command (step S120).

The time at which the TD (2) timer finishes measuring the predetermined period of time (2) is a time that is before the time at which the TD (1) timer finishes measuring the predetermined period of time (1). Fourth speed is established in the automatic transmission 300 based on the shift command that was output (step S138).

<A Case in which a Downshift Through Third Speed is Performed when the Invention is not Applied>

In this example, the automatic transmission 300 is capable of establishing six speeds. In this case, the speed that is determined based on the throttle opening amount, the vehicle speed, and a shift map is sixth speed, and a shift command indicative of sixth speed is output. In the hydraulic circuit 302, sixth speed is already established so a shift is not performed at this time.

Figure 6:
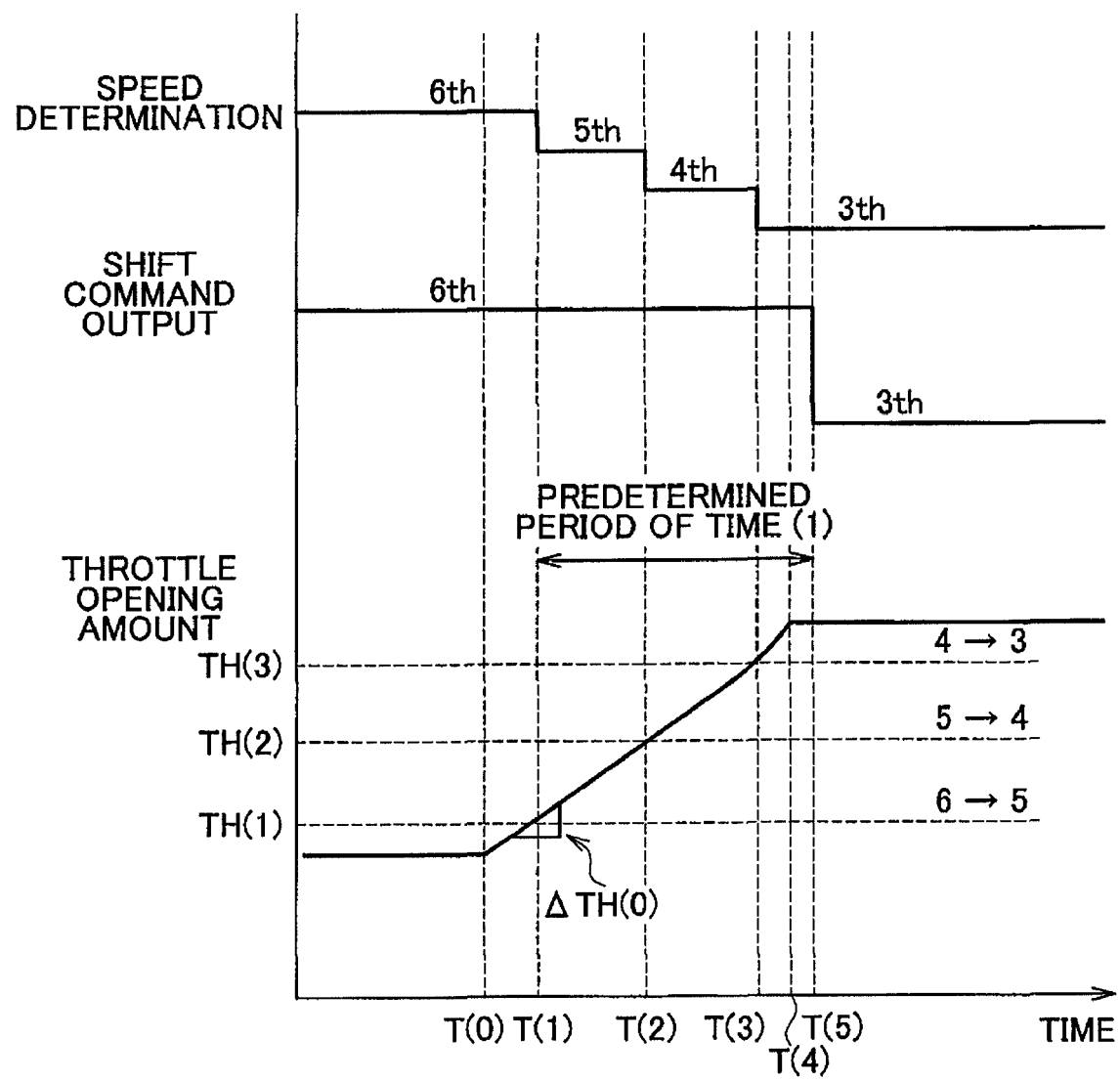
FIG. 6 is a timing chart (part 2) showing the shift operation when the invention is not applied.

As shown in FIG. 6, the throttle opening amount starts to increase at time T (0) when the driver depresses the accelerator pedal, for example.

When the throttle opening amount exceeds TH (1) at time T (1), the ECT_ECU 1020 changes the target speed from sixth speed to fifth speed. Also, as the ECT_ECU 1020 changes the target speed to fifth speed, it also starts the TD (1) timer and delays outputting the shift command if the change amount ΔTH of the throttle opening amount is greater than the ΔTH (0) corresponding to fifth speed.

When the throttle opening amount increases further such that it exceeds TH (2) at time T (2), the ECT_ECU 1020 changes the target speed from fifth speed to fourth speed. During this time, the period of time that was measured by the TD (1) timer has not passed the predetermined period of time (1) so the ECT_ECU 1020 continues to delay outputting of the shift command.

When the throttle opening amount increases further such that it exceeds TH (3) at time T (3), the ECT_ECU 1020 changes the target speed from fourth speed to third speed. During this time, the period of time that was measured by the TD (1) timer has not passed the predetermined period of time (1) so the ECT_ECU 1020 continues to delay outputting of the shift command.

At time T (4), the driver adjusts the depression amount of the accelerator pedal so that throttle opening amount is substantially constant at an amount that exceeds TH (3).

When the period of time measured by the TD (1) timer passes the predetermined period of time (1) at time T (5), the ECT_ECU 1020 stops delaying outputting the shift command such that a shift command indicative of third speed is output.

<A Case in which a Downshift Through Third Speed is Performed when the Invention is Applied>

In this example, the automatic transmission 300 is capable of establishing six speeds. In this case, the speed that is determined based on the throttle opening amount, the vehicle speed, and a shift map is sixth speed, and a shift command indicative of sixth speed is output. In the hydraulic circuit 302, sixth speed is already established so a shift is not performed at this time.

Figure 7:
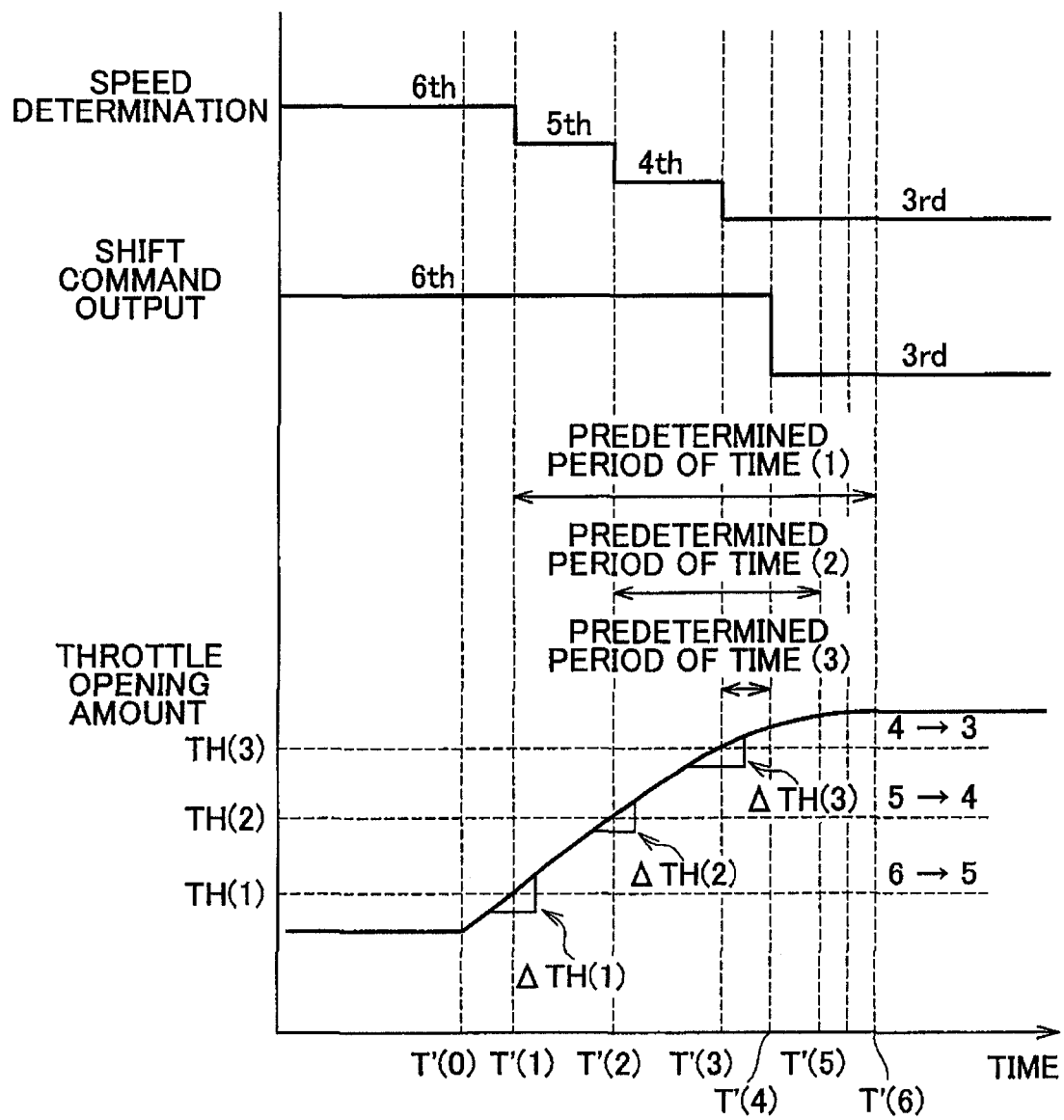
FIG. 7 is a timing chart (part 2) showing the operation of the ECT_ECU that serves as the control apparatus according to this example embodiment

As shown in FIG. 7, the throttle opening amount starts to increase at time T' (0) when the driver depresses the accelerator pedal, for example.

When the throttle opening amount exceeds TH (1) at time T' (1), the shift determination (1) is made (i.e., YES in step S100) and the ECT_ECU 1020 changes the target speed from sixth speed to fifth speed. Also, as the ECT_ECU 1020 changes the target speed to fifth speed, it also starts the TD (1) timer (step S106) and delays outputting the shift command (step S108) if the change amount ΔTH of the throttle opening amount is greater than the ΔTH (1) corresponding to fifth speed (i.e., YES in step S102). At this time, the TD (1) timer measures a predetermined period of time (1) corresponding to fifth speed.

When the throttle opening amount increases further such that it exceeds TH (2) at time T' (2), the shift determination (2) is made (i.e., YES in step S110) and the ECT_ECU 1020 changes the target speed from fifth speed to fourth speed. Also, if ΔTH is greater than ΔTH (2) corresponding to fourth speed (i.e., YES in step S112), the ECT_ECU 1020 continues to measure the time with the TD (1) timer and also starts the TD (2) timer (step S116). At this time, the TD (2) timer measures a predetermined period of time (2) corresponding to fourth speed.

When the throttle opening amount increases further such that it exceeds TH (3) at time T' (3), the shift determination (3) is made (i.e., YES in step S118) and the ECT_ECU 1020 changes the target speed from fourth speed to third speed. Also, if ΔTH is greater than ΔTH (3) corresponding to third speed (i.e., YES in step S122), the ECT_ECU 1020 continues to measure the time with the TD (1) timer and the TD (2) timer and also starts the TD (3) timer (step S126). At this time, the TD (3) timer measures a predetermined period of time (3) corresponding to third speed.

If at time T' (4) the TD (3) timer finishes measuring the predetermined period of time (3) without the shift determination (4) being made (i.e., NO in step S128), the ECT_ECU 1020 establishes the third speed determined in the shift determination (3) as the target speed and outputs a shift command (step S130).

At time T (6), the driver adjusts the depression amount of the accelerator pedal so that throttle opening amount is substantially constant at an amount that exceeds TH (3).

The time (T' (4)) at which the TD (3) timer finishes measuring the predetermined period of time (3) is a time before the time (T' (7)) at which the TD (1) timer finishes measuring the predetermined period of time (1) and the time (T ('5)) when the TD (2) timer finishes measuring the predetermined period of time (2). Fourth speed is established in the automatic transmission 300 based on the shift command that was output (step S138).

As described above, with the control apparatus of a vehicle according to this example embodiment, the ECT_ECU 1020 establishes a target speed based on the amount of change in the throttle opening amount each time the determined target speed is changed. If the amount of change in the throttle opening amount is large at the time the target speed is determined, it is predicted that the shift will be into a lower speed, i.e., a speed farther toward the deceleration side. Therefore, for example when, each time the target speed is changed, the period of time corresponding to the target speed that was changed is set as a waiting period and a downshift is performed through a plurality of speeds in response to a demand to increase the driving force, the waiting period can be set shorter than it is when a uniform period of time is set from the earliest point at which the downshift was determined. This is because the shift mode after the target speed that was changed is made the reference is limited. As a result, the shift command that was established can be promptly output. Also, when the amount of change in the throttle opening amount is small, the automatic transmission 300 will not shift into a speed farther toward the deceleration side (i.e., the automatic transmission 300 will not downshift farther) so if the target speed is established quickly, the established shift command can be output early. Therefore, a control apparatus of a vehicle that promptly outputs an established shift command when a downshift is performed through a plurality of speeds, a control method, and a recording medium on which is recorded a program that commands a computer to realize that control method can all be provided.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus of a vehicle provided with a stepped automatic transmission having a plurality of speeds, comprising:
   a detecting portion that detects an amount of an increase in vehicle driving force required by a driver;
   a determining portion that determines a target speed based on the amount of increase required;
   a change rate determining portion that, when the target speed is determined by the determining portion, determines whether a change rate of the amount of increase required is greater than a predetermined value that is determined in accordance with the target speed that is determined by the determining means most recently;
   a timer portion that, when the change rate determining portion determines that the change rate of the amount of increase required is greater than the predetermined value, counts down for a predetermined period of time that is set in accordance with the determined target speed;
   a target speed establishing portion that, when the timer portion has finished the counting down of the predetermined period of time, establishes the target speed determined by the determining portion; and
   when the determining portion determines a target speed that differs from the target speed that has been determined by the determining portion most recently and the change rate determining portion determines that the change rate of the amount of increase required is not greater than the predetermined value while the timer portion is counting down for the predetermined period of time, cancels the counting down by the timer portion and establishes the target speed determined by the determining portion most recently; and
   a control portion that controls the automatic transmission to shift into the established target speed.

2. The control apparatus according to claim 1, wherein the target speed establishing portion includes a portion that, when the change rate of the amount of increase required is greater than a predetermined value and the target speed does not change, establishes the target speed after the predetermined period of time corresponding to the determined target speed has passed from the most recent point at which the target speed was determined.

3. The control apparatus according to claim 1, further comprising:
   a vehicle speed detecting portion that detects a physical quantity corresponding to a speed of the vehicle,
   wherein the determining portion determines the target speed based on the detected physical quantity in addition to the amount of increase required.

4. The control apparatus according to claim 2, further comprising:
   a vehicle speed detecting portion that detects a physical quantity corresponding to a speed of the vehicle,
   wherein the determining portion determines the target speed based on the detected physical quantity in addition to the amount of increase required.

5. The control apparatus according to claim 1, wherein the established target speed is a vehicle speed.

* * * * *